(12) United States Patent
Kuang et al.

(10) Patent No.: US 8,117,435 B2
(45) Date of Patent: Feb. 14, 2012

(54) METHOD AND SYSTEM FOR SECURED DYNAMIC BIOS UPDATE

(75) Inventors: Ming Kuang, Shanghai (CN); Caidong Song, Nanfangxincun (CN); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/164,156

(22) Filed: Jun. 30, 2008

(65) Prior Publication Data

US 2011/0072254 A1    Mar. 24, 2011

(51) Int. Cl.
*G06F 1/24* (2006.01)
*G06F 9/00* (2006.01)

(52) U.S. Cl. ...................................................... 713/100
(58) Field of Classification Search ............... 713/2, 100
See application file for complete search history.

(56) References Cited

U.S. PATENT DOCUMENTS

| | | |
|---|---|---|
| 6,188,602 B1 * | 2/2001 | Alexander et al. ........ 365/185.04 |
| 2003/0120913 A1 * | 6/2003 | Wu et al. ........................ 713/100 |
| 2004/0003265 A1 * | 1/2004 | Freeman et al. ............... 713/191 |
| 2004/0024917 A1 * | 2/2004 | Kennedy et al. .................... 710/1 |
| 2009/0055641 A1 * | 2/2009 | Smith ............................ 713/100 |
| 2009/0198988 A1 * | 8/2009 | Bai et al. ........................... 713/2 |

* cited by examiner

*Primary Examiner* — Thomas Lee
*Assistant Examiner* — Xuxing Chen
(74) *Attorney, Agent, or Firm* — Barre Law Firm, PLLC

(57) ABSTRACT

In some embodiments, the invention involves providing a secure BIOS update to selective user operating systems in a platform conforming to virtualization technology. In an embodiment, a provision agent in a service operating system identifies requests for BIOS updates received from a management console and forwards authorized update requests to a virtual machine monitor (VMM) for processing the updates according to platform policy. An update may be applied immediately to some user operating systems and be delayed in others. Some updates may require an immediate reboot of the platform. Other embodiments are described and claimed.

23 Claims, 3 Drawing Sheets

METHOD AND SYSTEM FOR SECURED DYNAMIC BIOS UPDATE

FIELD OF THE INVENTION

An embodiment of the present invention relates generally to computing systems and, more specifically, to providing a secure BIOS update.

BACKGROUND INFORMATION

Various mechanisms exist for updating the basic input output system (BIOS) on a computing device. Existing systems typically use one of two approaches.

One approach, geared toward achieving high security is only allowing a BIOS update in the pre-boot environment. The BIOS update utility will first copy a BIOS image to specific memory location, and then conduct S3 (suspend to RAM). In the execution path of S3 resume, the BIOS code will authenticate the BIOS image in memory and then update it to a non-volatile memory, typically a Flash memory part. This approach is typically adopted in normal BIOS implemented on some processors available from Intel® Corporation having an Extensible Firmware Interface (EFI) architecture.

A second approach it to avoid any reboot (or S3) that might interrupt user operation in operating system (OS) lifecycle. The BIOS update may be performed via normal input/output (I/O) instructions or a system management interrupt (SMI) interface. This is a kind of trade off between usability and security. This approach may introduce a security hole that allows malware/virus to use the same mechanism to damage the Flash memory part.

It is also the case that the Flash memory part containing the BIOS is locked during runtime. Thus, in existing systems, the platform must be rebooted to unlock the Flash memory in order to update the BIOS. This reboot ultimately requires down time for all users and virtual machines (guest operating systems) on a virtualization architecture platform. This down time is often undesirable or unacceptable.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to taking advantage of the EIT (Embedded IT) infrastructure to conduct a flash update in a trusted service operating system (SOS or Service OS). In this fashion, a User OS (UOS) will not be aware of the BIOS update. No immediate reboot is required for the UOS after a BIOS update is performed, according to an embodiment of the invention, unless the user desires that the new BIOS image take effect immediately. Any flash update attempt from un-trusted UOS may be blocked by a Virtual Machine Monitor (VMM).

In existing systems, the operation of a platform without any virtualized components presumes that a re-boot would ensure that any firmware update would have taken effect. However, in existing virtualized clients, this is not the case, nor the user experience. In at least one embodiment, the present invention is intended to address this issue in a secure and efficient manner; thus, not requiring a full reboot of the entire platform and all virtualized components.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
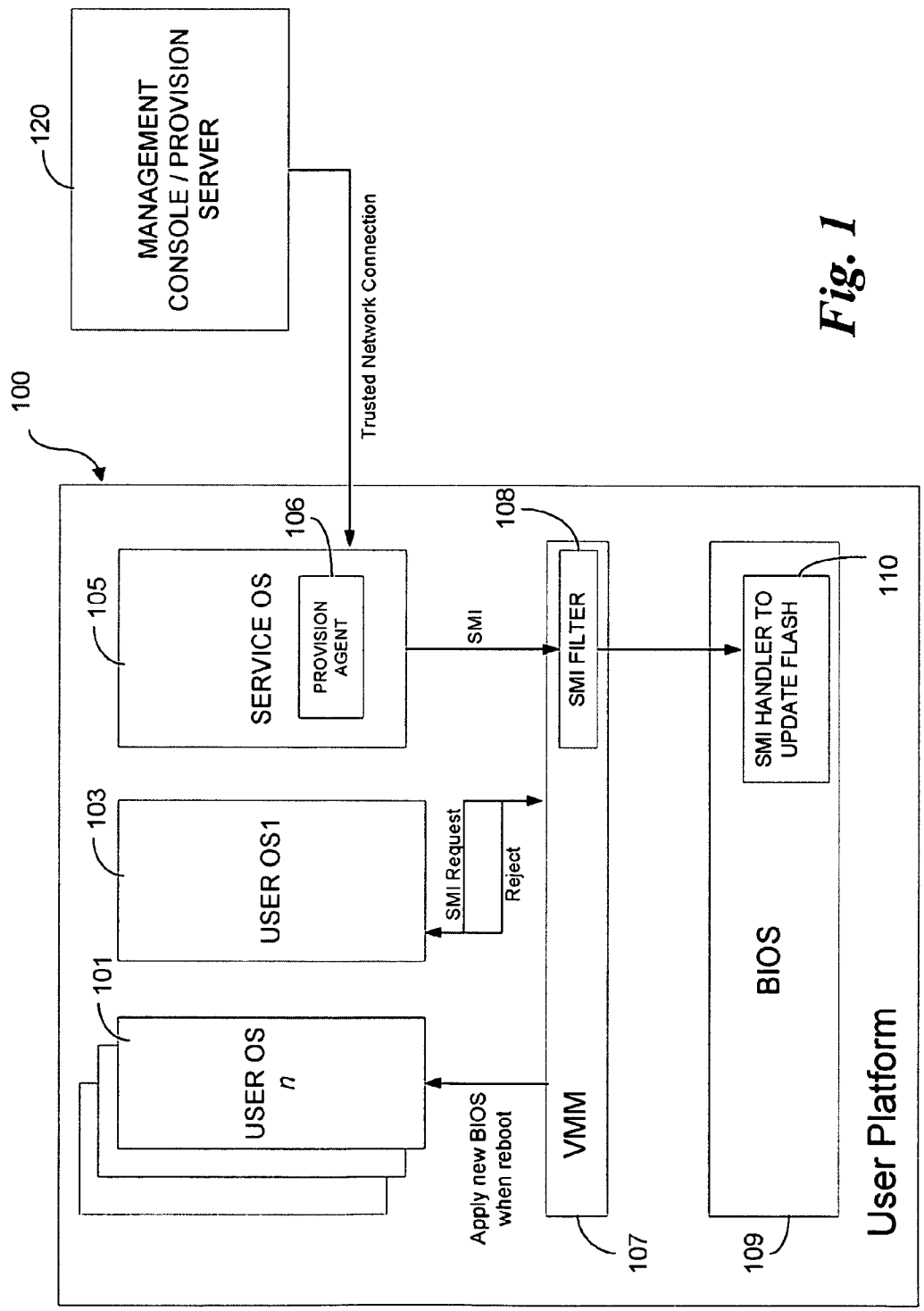
FIG. 1 is a block diagram of a platform illustrating components and their relationship, according to an embodiment of the invention.

FIG. 1 is a block diagram of a platform illustrating components and their relationship, according to an embodiment of the invention. In an embodiment, a platform 100 has a processor (not shown) to execute in a virtualized environment. The processor may be any type of processor capable of executing software, such as a microprocessor, digital signal processor, microcontroller, or the like. There may be one or more processors in platform hardware 100 and one or more of the processors may include multiple threads, multiple cores, or the like. In some embodiments, the processor(s) or cores, may have an integrated memory controller instead of a memory controller hub on the motherboard.

A virtual machine monitor (VMM) 107 operates to control one or more virtual machines or service operating systems. FIG. 1 illustrates a first user operating system 103, and n user operating systems 101. A service operating system (SOS) 105 may run at a different privilege level and may be configured to execute system services that are desired to be inaccessible to the user operating systems 101, 103. It will be understood that varying numbers of user operating systems may be executing on the platform 100, in one or more processors, cores, or threads.

In an embodiment, the SOS 105 contains a provision agent 106. The provision agent may communicate with a system management interrupt (SMI) filter 108 executing within the VMM 107. The BIOS 109 may be configured with an SMI handler 110, to update Flash memory with a new BIOS, according to embodiments of the invention.

A remote management console, or provision server, 120 may be connected to the platform 100 via a trusted network connection. The management console 120 may send a BIOS update request to the platform 100, via the trusted network connection. This BIOS update may be initiated by a remote administrator controlling the management console 120. It will be understood that a variety of secure protocols may be used to communicate between the management console 120 and the platform 100. The management console may communicate with the platform via a network interface card (NIC) on the platform. The NIC may be coupled to the motherboard, an input output hub (IOH), a manageability engine executing Intel® Active Management Technology (iAMT), or other architectural connectivity. The platform 100 may have multiple NICs. A virtual machine monitor (VMM) 107 may control communication to/from the NIC and forward the communication to an appropriate device, guest OS or SOS. In an embodiment of the invention, the VMM 107 may direct BIOS update requests to a provision agent 106 in the SOS 105. The VMM 107 using the SMI filter 108 may initiate the BIOS update via the SMI handler 110.

When a BIOS update is identified by the provision agent 106, the agent may then assert an SMI which will be filtered by the SMI filter 108 in the VMM 107.

Based on UOS policies, an update to the platform BIOS may be integrated immediately by rebooting the UOS, or be delayed for some period of time. In any case, if the platform 100 undergoes a hard boot, each UOS will have the updated BIOS automatically applied upon the reboot.

In an embodiment of the invention, when a BIOS update is required, an enterprise IT administrator may push the BIOS image to the provision agent in the SOS of the client machine through a trusted network connection from management console. The SOS ensures a secured execution environment to conduct the BIOS update. An SMI may be employed to perform final flash update execution. An SMI filter inside VMM may ensure that only the SMI request from SOS will be passed on to SMI handler prepared by BIOS, and any other Flash update SMI requested by un-trusted UOS will be blocked, or rejected by the SMI filter. This may be achieved by trapping SMI requests in the VMM through monitoring a corresponding port.

The BIOS update is transparent to a UOS; the UOS is not aware of the BIOS update done in SOS. For the VMM, the updated BIOS may only take effect after a physical reboot of the machine. For a UOS or SOS, the VMM may apply the new BIOS to the virtual machine on which the UOS/SOS is executing when the UOS/SOS is rebooted. Thus, the updated BIOS will take effect for UOS/SOS without a reboot of the physical machine. In this event, a running service in User OS 1 (103) will not be impacted if User OS n (101) needs a reboot to apply new BIOS.

Each guest OS executing on the virtualization platform has its own copy of BIOS and system services in memory that is partitioned for that guest OS. Thus, the SMI handler may operate to update the BIOS in an individual guest OS by rewriting or updating their BIOS portion without rebooting the entire platform. For the localized BIOS updates to take effect, only the OS running in the updated virtual machine (VM) must be rebooted. Thus, if a user OS is executing time critical code, the reboot of that user OS may be delayed or put off entirely until the platform is rebooted.

When the BIOS update image is received by the platform, the VMM may store the image in volatile, or system memory until it is recorded in the system Flash memory. In some embodiments, the VMM may store the image in a local or remote hard drive so that the data does not get lost, for instance with a power loss before the image is written to Flash memory.

It will be understood that there are many types of updates, for instance, system or runtime services that may be implemented individually on a user OS without requiring a reboot. It will also be understood that some BIOS changes relating to hardware will require a reboot of the entire platform to take effect.

Figure 2:
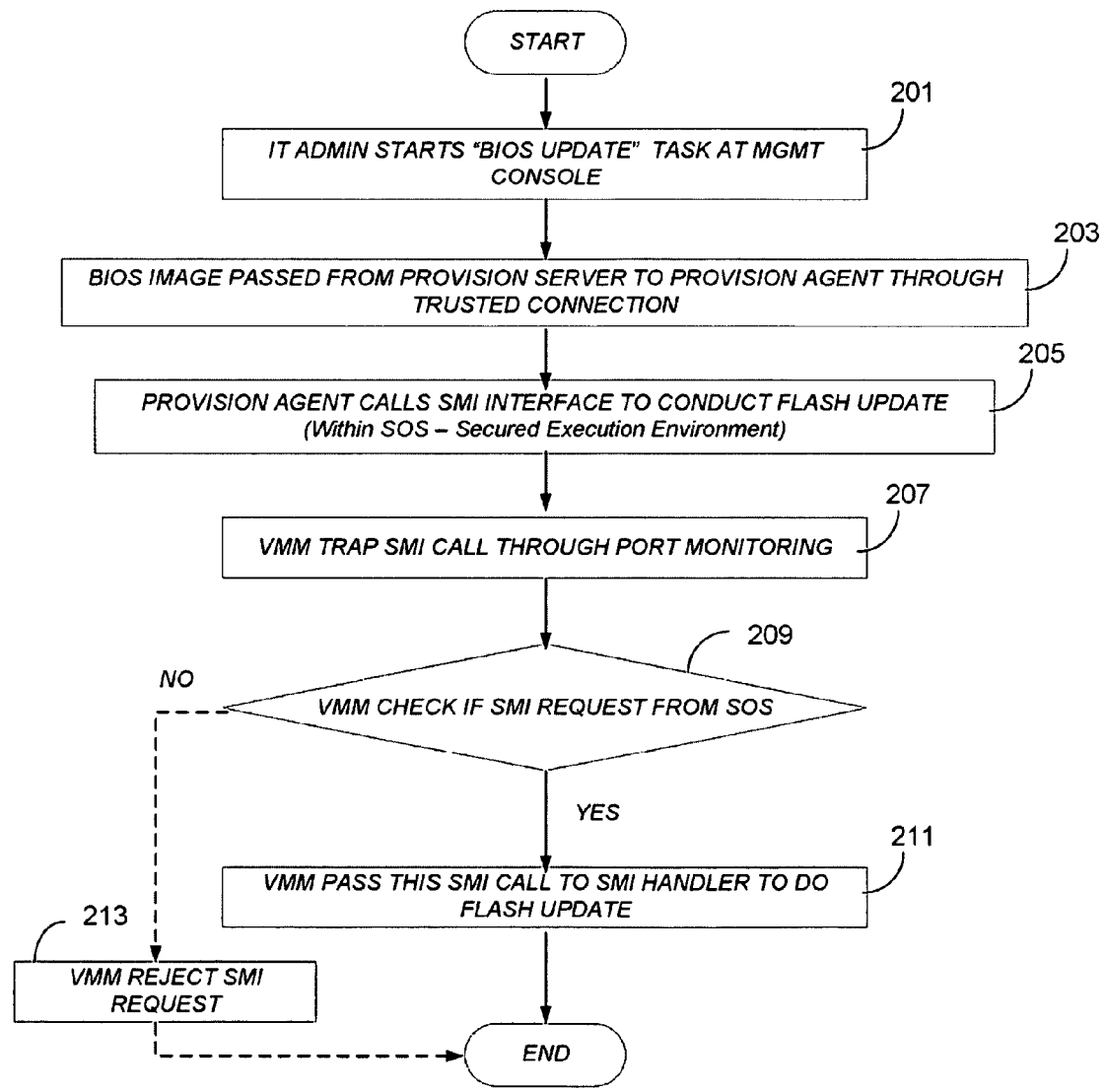
FIG. 2 is a flow diagram of an exemplary method for updating the platform BIOS, according to an embodiment of the invention.

FIG. 2 is a flow diagram of an exemplary method for updating the platform BIOS, according to an embodiment of the invention. In one embodiment, an IT administrator may initiate a BIOS update at a management console (aka provision server), in block 201. The BIOS image is passed from the management console to a provision agent in the SOS, via a trusted connection, in block 203. The provision agent calls the SMI interface to conduct the Flash memory update with the updated BIOS, within the SOS execution environment, in block 205. The VMM may trap the SMI call through port monitoring by the SMI filter, in block 207.

A determination is made in block 209 as to whether the trapped SMI request was made from the SOS, or secured connection. If not, the VMM rejects the SMI request in block 213. In some cases, the SMI will be unrelated to a BIOS update. In that case, the SMI may be handled normally. If the SMI request did come from the SOS, then the VMM passes the SMI call to the SMI handler to perform the Flash update of the BIOS, in block 211. The SMI handler may be a capsule service within the BIOS. Based on platform and/or User OS policy, the updates may be applied immediately to each User OS, delayed, or force a platform reboot. In either case, a copy of the updated BIOS image will be written to the BIOS portion of memory for each User OS that is to be updated.

Figure 3:
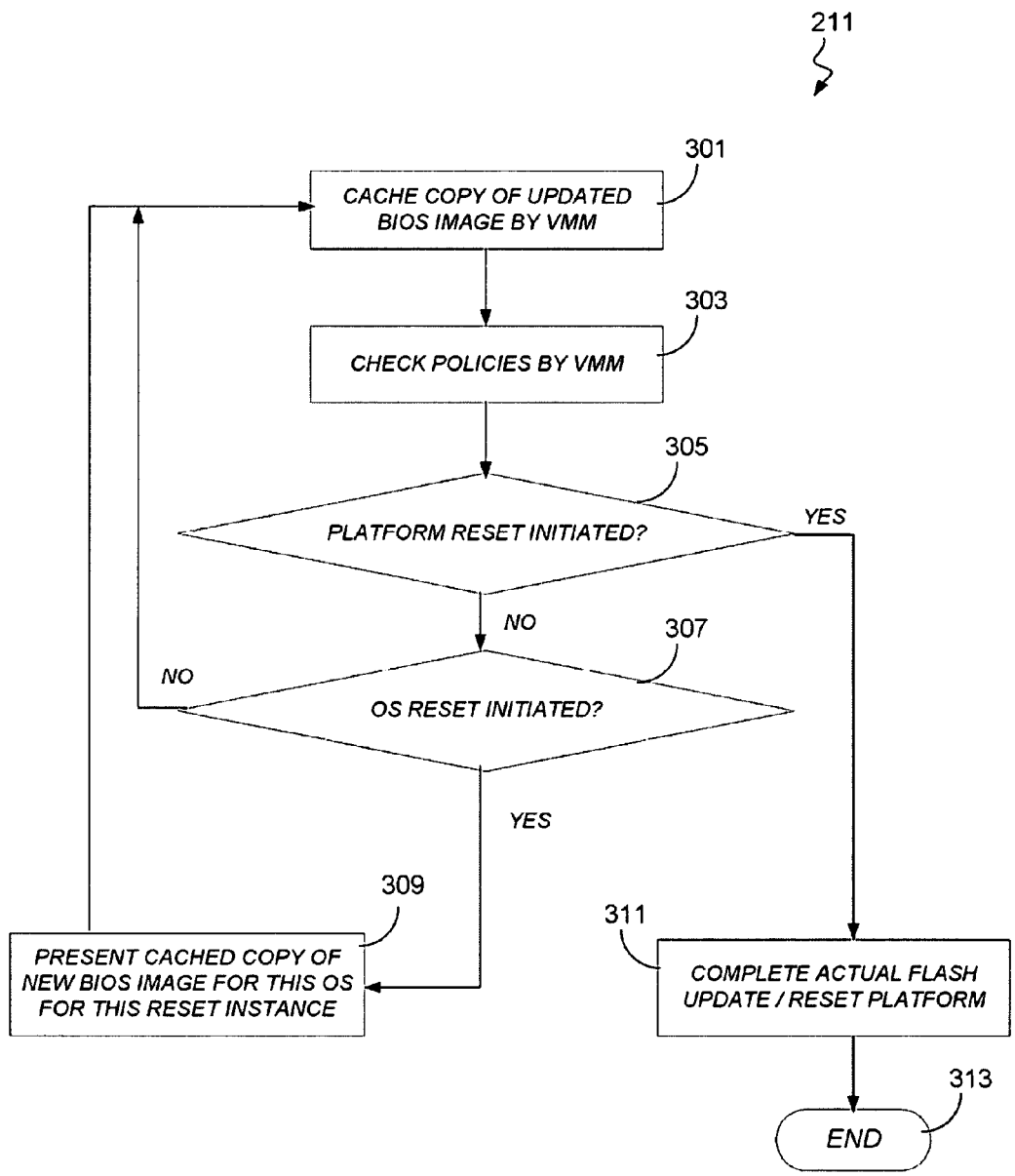
FIG. 3 is a flow diagram illustrating an exemplary method for User operating system BIOS update, according to an embodiment of the invention.

FIG. 3 is a flow diagram illustrating an exemplary method for user operating system BIOS update, according to an embodiment of the invention. This figure expands on the operation of block 211, of FIG. 2. In an embodiment, once the BIOS update is received, the VMM caches a copy of the received image, in block 301. This caching operation may be performed for each user OS, as indicated by the loop from blocks 307 and 309 to 301. In an embodiment, the VMM utilizes the SMI filter to cache the image. The BIOS update image may be stored in volatile system memory, or local or remote non-volatile memory, or a combination, in block 301. The VMM, and in one embodiment, the SMI filter, checks local policies, based on the received update and user OS preferences to determine whether to update selective user OSes, all user OSes, or reboot the platform, in block 303. In an embodiment, the VMM may poll each user OS to determine whether the OS will allow, or prefers and immediate update and reboot, or requests a delay. This polling may be based on platform policy, a user response, or a combination. A response indicating that the UOS will not allow a reboot may cause the VMM to continue to poll the UOS, awaiting an affirmative response. If the entire platform is to be updated and rebooted, as determined in block 305, the actual Flash memory unit is updated and the platform is reset, in block 311 and the process ends (313). If policy dictates that the platform need not be reset as a whole, then it is determined whether an update is to be initiated in each UOS, in block 301. If the specific UOS is to be updated and reset, then the cached copy of the updated BIOS image for this UOS is stored in the appropriate location, and the UOS is reset, or rebooted to apply the update, in block 309. Each UOS is polled or checked via policy, in turn. In the case where a UOS requests, or is determined by policy, a delay in updating, the check in block 307 is repeated until each user OS has allowed an update. In some cases, a platform reboot may be scheduled at a specific time interval, regardless of whether the UOS explicitly allows the update. In some cases, information regarding forced immediate boot or time interval policy, may be sent to the platform from the management console, with the updated BIOS image. In this case, the provisioning agent may identify these administrative policies and forward them to the SMI handler, as appropriate.

In embodiments of the invention, the SMI handler is the final agent by which the change may be committed, and in some implementations there may be two stages of SMI handlers. The first handler may be the SMI filter itself, which scrutinizes the SMI and applies various policy actions upon in response to the SMI. The SMI filter may be embodied within the VMM. The second handler initiates the FLASH update and may be embodied within the BIOS component itself. In one embodiment, the SMI filter may be the final arbiter.

In another embodiment, the VMM generates a read-only copy of the BIOS to be accessible by each user OS. In this case, each user OS has a mapping to the read-only portion of memory controlled by the VMM. Thus, in this embodiment, only one copy of the updated BIOS is necessary, on the platform. In cases where the user OS prefers a delay, the vector mapping to the new BIOS update may also be delayed.

For fault tolerance, once the BIOS image has been cached, but before a full platform reboot, the bootnext variable may be set to point to the updated image. Thus, in case of a power or other failure, the platform will reboot with the updated BIOS image on the next reset or power up.

In an embodiment with a legacy BIOS, e.g., non-EFI, typically the entire BIOS image is sent from the management console. In platforms having an EFI architecture, portions of the BIOS image may be sent individually.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for selectively updating a basic input output system image on a platform, the method comprising:
   executing a virtual machine monitor (VMM) on a platform, wherein the VMM supports a first virtual machine (VM) executing a service operating system (OS) and a second VM executing a user OS, and wherein the VMM provides each of the first and second VMs with an existing basic input output system (BIOS);
   receiving a BIOS update image at the platform from a remote data processing system;
   in response to receiving the BIOS update image at the platform, sending a BIOS update request from the service OS to the VMM;
   in response to receiving the BIOS update request at the VMM, automatically determining whether the BIOS update request came from the service OS;
   automatically rejecting the BIOS update request in response to a determination that the BIOS update request did not come from the service OS; and
   in response to a determination that the BIOS update request came from the service OS, applying the BIOS update.

2. A method according to claim 1, wherein:
the user OS comprises a first user OS;
the VMM supports a third VM executing a second user OS, and the VMM provides the third VM with the existing BIOS; and
the operation of applying the BIOS update comprises:
determining whether the second VM should receive the BIOS update substantially immediately;
determining whether the third VM should receive the BIOS update substantially immediately; and
in response to a determination that the second VM should receive the BIOS update substantially immediately and the third VM should not receive the BIOS update substantially immediately, using the BIOS update image to update at least part of the existing BIOS for the second VM without updating the existing BIOS for the third VM.

3. A method according to claim 2, wherein the operation of using the BIOS update image to update at least part of the existing BIOS for the second VM without updating the existing BIOS for the third VM comprises:
causing the second VM to reboot without causing the third VM to reboot.

4. A method according to claim 2, wherein the operation of determining whether the second VM should receive the BIOS update substantially immediately comprises:
polling the first user OS to determine whether the first user OS will allow a substantially immediate BIOS update.

5. A method according to claim 2, wherein the operation of determining whether the second VM should receive the BIOS update substantially immediately is performed by the VMM.

6. A method according to claim 2, wherein:
the operation of sending the BIOS update request from the service OS to the VMM comprises sending a system management interrupt (SMI) request from the service OS to the VMM; and
the operation of determining whether the second VM should receive the BIOS update substantially immediately is performed by the VMM, in response to receiving the SMI request.

7. A method according to claim 1, wherein the operation of determining whether the second VM should receive the BIOS update substantially immediately is performed by the VMM.

8. A method according to claim 1, wherein:
the operation of sending the BIOS update request from the service OS to the VMM comprises sending a system management interrupt (SMI) request from the service OS to the VMM; and
the operation of determining whether the second VM should receive the BIOS update substantially immediately is performed by the VMM, in response to receiving the SMI request.

9. A method according to claim 1, wherein the platform receives the BIOS update image from the remote data processing system via a trusted network connection with the remote data processing system.

10. An article of manufacture comprising:
a non-transitory machine accessible storage medium; and
instructions in the storage medium which, when executed by a processing system platform, enable the platform to perform operations comprising:
executing a virtual machine monitor (VMM) that supports a first virtual machine (VM) executing a service operating system (OS) and a second VM executing a user OS, wherein the VMM provides each of the first and second VMs with an existing basic input output system (BIOS);
receiving a BIOS update image from a remote data processing system;
in response to receiving the BIOS update image, sending a BIOS update request from the service OS to the VMM;
in response to receiving the BIOS update request at the VMM, automatically determining whether the BIOS update request came from the service OS;
automatically rejecting the BIOS update request in response to a determination that the BIOS update request did not come from the service OS; and
in response to a determination that the BIOS update request came from the service OS, applying the BIOS update.

11. An article of manufacture according to claim 10, wherein:
the user OS comprises a first user OS;
the VMM supports a third VM executing a second user OS, and the VMM provides the third VM with the existing BIOS; and
the operation of applying the BIOS update comprises:
determining whether the second VM should receive the BIOS update substantially immediately;
determining whether the third VM should receive the BIOS update substantially immediately; and
in response to a determination that the second VM should receive the BIOS update substantially immediately and the third VM should not receive the BIOS update substantially immediately, using the BIOS update image to update at least part of the existing BIOS for the second VM without updating the existing BIOS for the third VM.

12. An article of manufacture according to claim 11, wherein the operation of using the BIOS update image to update at least part of the existing BIOS for the second VM without updating the existing BIOS for the third VM comprises:
causing the second VM to reboot without causing the third VM to reboot.

13. An article of manufacture according to claim 11, wherein the operation of determining whether the second VM should receive the BIOS update substantially immediately comprises:
polling the first user OS to determine whether the first user OS approves a substantially immediate BIOS update.

14. An article of manufacture according to claim 11, wherein the operation of determining whether the second VM should receive the BIOS update substantially immediately is performed by the VMM.

15. An article of manufacture according to claim 11, wherein:
the operation of sending the BIOS update request from the service OS to the VMM comprises sending a system management interrupt (SMI) request from the service OS to the VMM; and
the operation of determining whether the second VM should receive the BIOS update substantially immediately is performed by the VMM, in response to receiving the SMI request.

16. An article of manufacture according to claim 10, wherein the operation of determining whether the second VM should receive the BIOS update substantially immediately is performed by the VMM.

17. An article of manufacture according to claim 10, wherein:

the operation of sending the BIOS update request from the service OS to the VMM comprises sending a system management interrupt (SMI) request from the service OS to the VMM; and the operation of determining whether the second VM should receive the BIOS update substantially immediately is performed by the VMM, in response to receiving the SMI request.

18. A data processing system comprising:
a processor;
a non-transitory machine accessible storage medium responsive to the processor; and
instructions in the storage medium which, when executed by the processor, enable the data processing system to perform operations comprising:
  executing a virtual machine monitor (VMM) that supports a first virtual machine (VM) executing a service operating system (OS) and a second VM executing a user OS, wherein the VMM provides each of the first and second VMs with an existing basic input output system (BIOS);
  receiving a BIOS update image from a remote data processing system;
  in response to receiving the BIOS update image, sending a BIOS update request from the service OS to the VMM;
  in response to receiving the BIOS update request at the VMM, automatically determining whether the BIOS update request came from the service OS;
  automatically rejecting the BIOS update request in response to a determination that the BIOS update request did not come from the service OS; and
  in response to a determination that the BIOS update request came from the service OS, applying the BIOS update.

19. A data processing system according to claim 18, wherein:
the user OS comprises a first user OS;
the VMM supports a third VM executing a second user OS, and the VMM provides the third VM with the existing BIOS; and the operation of applying the BIOS update comprises:
  determining whether the second VM should receive the BIOS update substantially immediately;
  determining whether the third VM should receive the BIOS update substantially immediately; and
  in response to a determination that the second VM should receive the BIOS update substantially immediately and the third VM should not receive the BIOS update substantially immediately, using the BIOS update image to update at least part of the existing BIOS for the second VM without updating the existing BIOS for the third VM.

20. A data processing system according to claim 19, wherein the operation of using the BIOS update image to update at least part of the existing BIOS for the second VM without updating the existing BIOS for the third VM comprises:
  causing the second VM to reboot without causing the third VM to reboot.

21. A data processing system according to claim 19, wherein the operation of determining whether the second VM should receive the BIOS update substantially immediately comprises:
  polling the first user OS to determine whether the first user OS approves a substantially immediate BIOS update.

22. A data processing system according to claim 18, wherein the operation of determining whether the second VM should receive the BIOS update substantially immediately is performed by the VMM.

23. A data processing system according to claim 18, wherein:
the operation of sending the BIOS update request from the service OS to the VMM comprises sending a system management interrupt (SMI) request from the service OS to the VMM; and
the operation of determining whether the second VM should receive the BIOS update substantially immediately is performed by the VMM, in response to receiving the SMI request.

* * * * *